United States Patent [19]

Whitener

[11] 4,120,470
[45] Oct. 17, 1978

[54] EFFICIENT TRAILING EDGE SYSTEM FOR AN AIRCRAFT WING

[75] Inventor: Philip Charles Whitener, Seattle, Wash.

[73] Assignee: The Boeing Company, Seattle, Wash.

[21] Appl. No.: 727,507

[22] Filed: Sep. 28, 1976

[51] Int. Cl.² .................. B64C 9/20; B64C 21/08
[52] U.S. Cl. .................... 244/213; 244/215; 244/216
[58] Field of Search .......... 244/42 CB, 42 D, 42 DA, 244/42 DB, 42 CA, 12.5, 230, 110 B, 213, 215, 216; 239/265.19; 60/226 A, 228, 230

[56] References Cited

U.S. PATENT DOCUMENTS

| | | | |
|---|---|---|---|
| 1,422,616 | 7/1922 | Page | 244/42 DB |
| 2,635,837 | 4/1953 | Grant | 244/213 |
| 3,837,601 | 9/1974 | Cole | 244/42 DB |
| 3,977,630 | 8/1976 | Lewis et al. | 244/42 DB |
| 3,987,983 | 10/1976 | Cole | 244/42 DB |

FOREIGN PATENT DOCUMENTS 519,236  3/1940  United Kingdom ............ 244/42 DB

*Primary Examiner*—Trygve M. Blix
*Assistant Examiner*—Charles E. Frankfort
*Attorney, Agent, or Firm*—Daniel T. Anderson; Robert W. Jenny; Bernard A. Donahue

[57] ABSTRACT

A trailing edge system including spoilers and flaps in which the spoilers serve as both spoilers and as fairing surfaces which 1) maintain smooth upper wing surface contours for all flap positions and 2) enable relatively small, lighter weight flaps to have the effects of larger, heavier ones.

3 Claims, 9 Drawing Figures

EFFICIENT TRAILING EDGE SYSTEM FOR AN AIRCRAFT WING

BACKGROUND OF THE INVENTION

1. Field of the Invention

This invention relates generally to the field of aircraft flight control and more particularly to wing trailing edge systems for maneuvering the airplane, adjusting the aerodynamics for more efficient flight and modifying the airfoil to suit landing and takeoff flight requirements. The invention has particular utility on very large airplanes. These airplanes are designed to be highly efficient, as indicated by the fact that the weight of their structure is to be as small as 25% of the maximum take-off weight of the airplane. This means that all the structure must be as light as possible, including the flaps and spoilers. Also, the power required to control the flaps and spoilers must be as low as possible, to minimize the weight of the power generators, and the power transmission and utilization equipment.

Further, to be as economically feasible as possible, these airplanes must be able to lift great payloads from runways of conventional lengths. This means that all available wind area should be usable for landing and taking off. This means, in turn, that whereas in conventional airplanes the lift augmenting flaps are used on only part of the wing span and the remaining span is devoted to flight control, on these airplanes the lift augmenting devices must be full span. The implications of this are that the lift augmentation devices must serve also as primary flight controls and therefore must be light and responsive enough to serve as flight controls.

To best meet their economic and mission requirements it is also important that these airplanes be as inexpensive to build and maintain as possible. The implication from this fact on the trailing edge system is that it must provide very good aerodynamic effects while being structurally and mechanically simple.

One example of prior art of particular interest is that disclosed in U.S. Pat. No. 3,478,988, to Age E. Roed. FIGS. 1 and 2 of this disclosure are reproductions of FIGS. 3 and 4 from Roed's patent. FIG. 1 shows Roed's apparatus set for takeoff and FIG. 2 shows it set for approach and landing. This apparatus, although successful in some respects, does not solve the problems or satisfy the criteria above primarily because, as can be seen in both figures, there is a rather abrupt "break" in the upper wing surface where the trailing edge of spoiler 51 comes close to the upper surface of flap 37. This break interferes with smooth flow over the flap, particularly in the approach and landing situation. The subject invention is directed toward providing improved upper surface curvature in trailing edge apparatus in which the spoilers are used in conjunction with the trailing edge flaps for lift augmentation and flight control.

SUMMARY OF THE INVENTION

Briefly, the objective of the invention is achieved, in accordance with the structural aspects of an example thereof in which smooth upper wing surface curvature for all positions of cooperating spoilers and flaps is achieved by providing controlled flexing of the spoilers. The example includes a trailing edge apparatus for an airplane wing having fixed structure with an upper surface. The trailing edge apparatus includes a spoiler assembly having an upper surface and a trailing edge and a flap assembly having an upper surface. The wing and spoiler assembly upper surfaces in combination effectively form a continuation of the aft portion of the upper surface of the wing. The spoiler assembly and flap assembly are pivotally attached to the fixed structure of the wing. The spoiler assembly includes a rigid element which has an upper surface which is part of the upper surface of the spoiler assembly and a flexible element attached to and extending forward from the rigid element. The upper surface of the flexible element also is part of the upper surface of the spoiler assembly and is slidably interconnected with the fixed structure of the wing. Independent actuation means are provided for the spoiler assembly and flap assembly for adjusting the positions of the spoiler assembly, flap assembly and fixed structure related to each other. The flexible element of the spoiler assembly functions to ensure that the aft upper surface of thw wing is smoothly curved for all adjustments. The smooth curvature enhances aerodynamic efficiency. The cooperative use of the spoilers and flaps provides the effectiveness of a flap with a chord equal to the combined chords of the spoilers and flaps. Therefore the weight of the actual flap in the disclosed apparatus is less than that of an equivalent conventional flap with a chord equal to the combined spoiler/flap chord. This saving of weight increases overall aircraft efficiency. The lesser weight and size of the flap reduce control power requirements and enhance responsiveness, both enhancing the airplane's efficiency.

In another example, the upper surface curvature is similarly made flexibly continuous without incorporation of a spoiler per se mechanism; that is, the flexible surface member does not include means for pivoting it upwardly into the air stream in a spoiling mode.

BRIEF DESCRIPTIONS OF THE DRAWINGS

Figure 1:
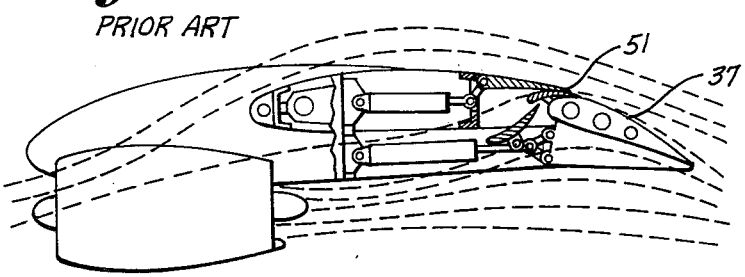
FIG. 1 shows a prior art embodiment of a trailing edge system with cooperation of the spoilers and flaps for flap effect, with the apparatus adjusted for takeoff.
Figure 2:
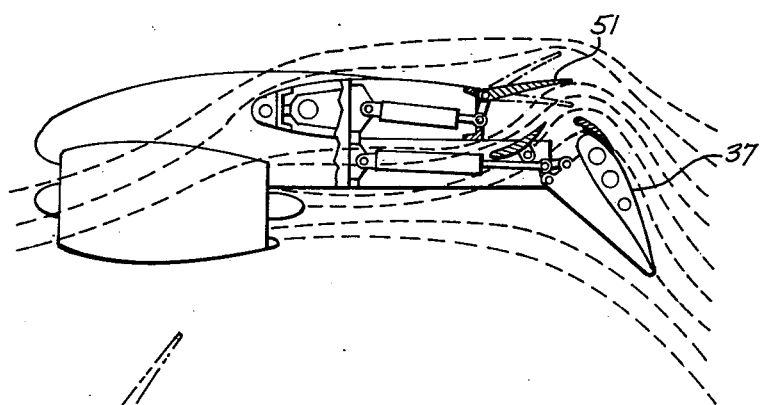
FIG. 2 shows the embodiment of FIG. 1 adjusted for approach and landing.
Figure 3:
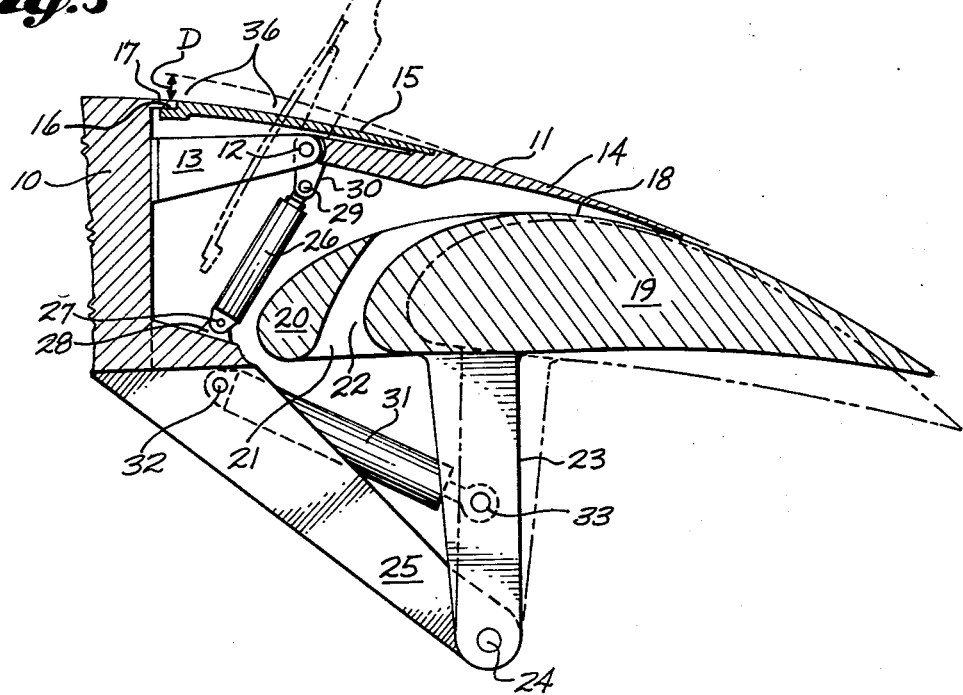

FIG. 3 is a schematic view of an example of one embodiment of the subject invention, adjusted for cruise. Other cruise adjustments are shown in dashed lines. Spoiler adjustment for lift spoiling is also shown by dashed lines.

Figure 3A:
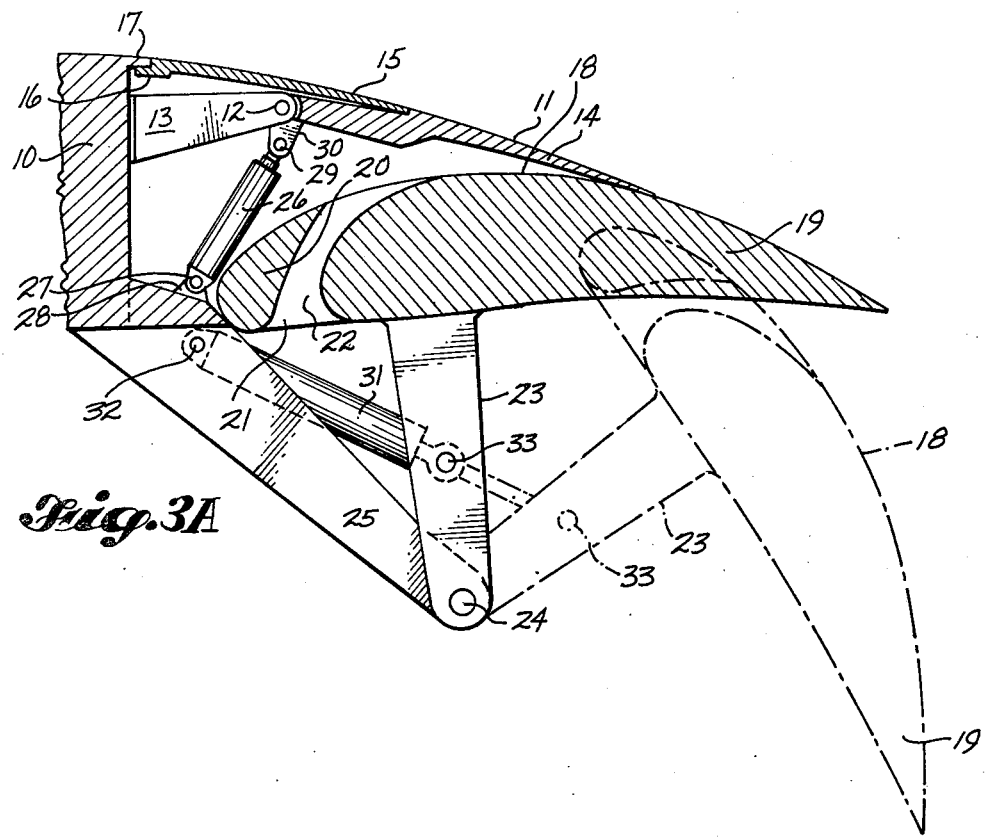

FIG. 3a is a view which shows the FIG. 3 embodiment with the flap adjusted for approach and landing.

Figure 4:
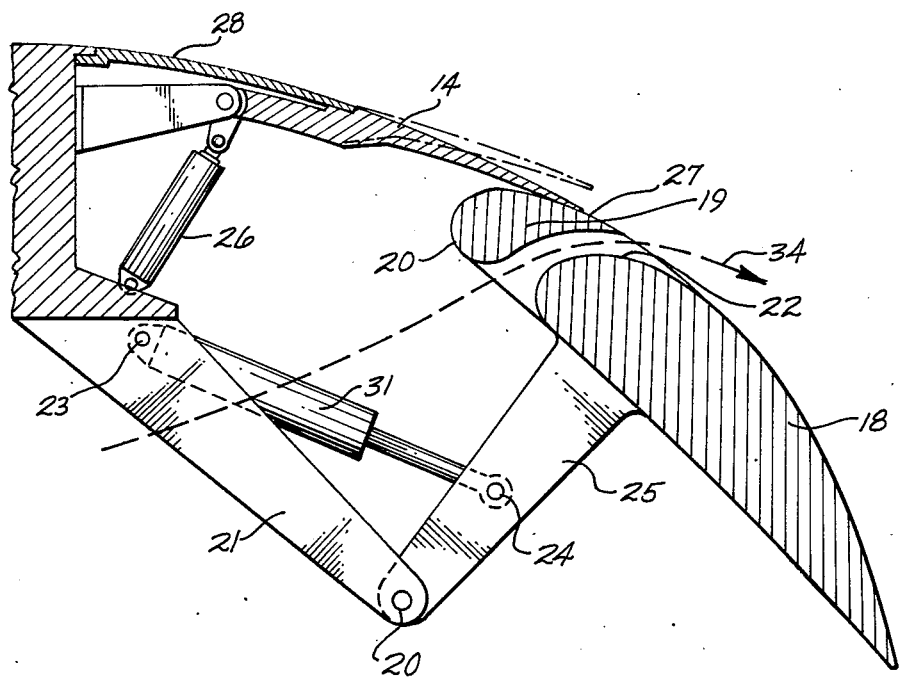

FIG. 4 is a schematic view of the same embodiment adjusted for takeoff.

Figure 5:
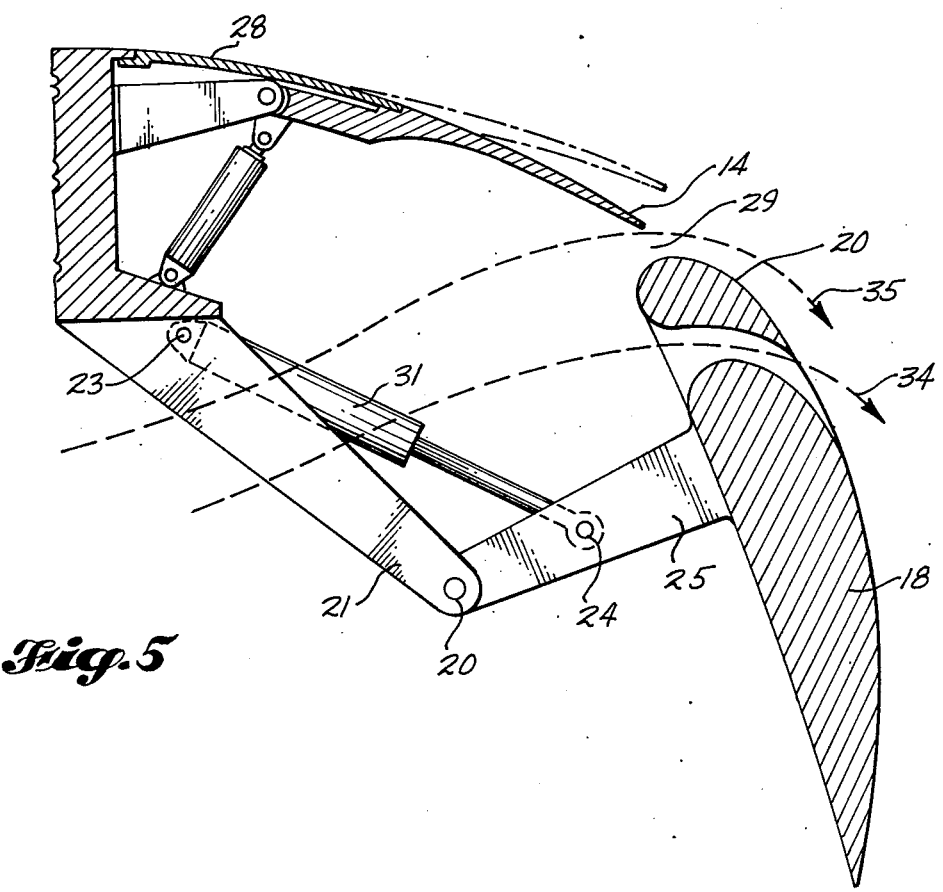

FIG. 5 is a schematic view of the same embodiment adjusted for approach and landing.

Figure 6A:
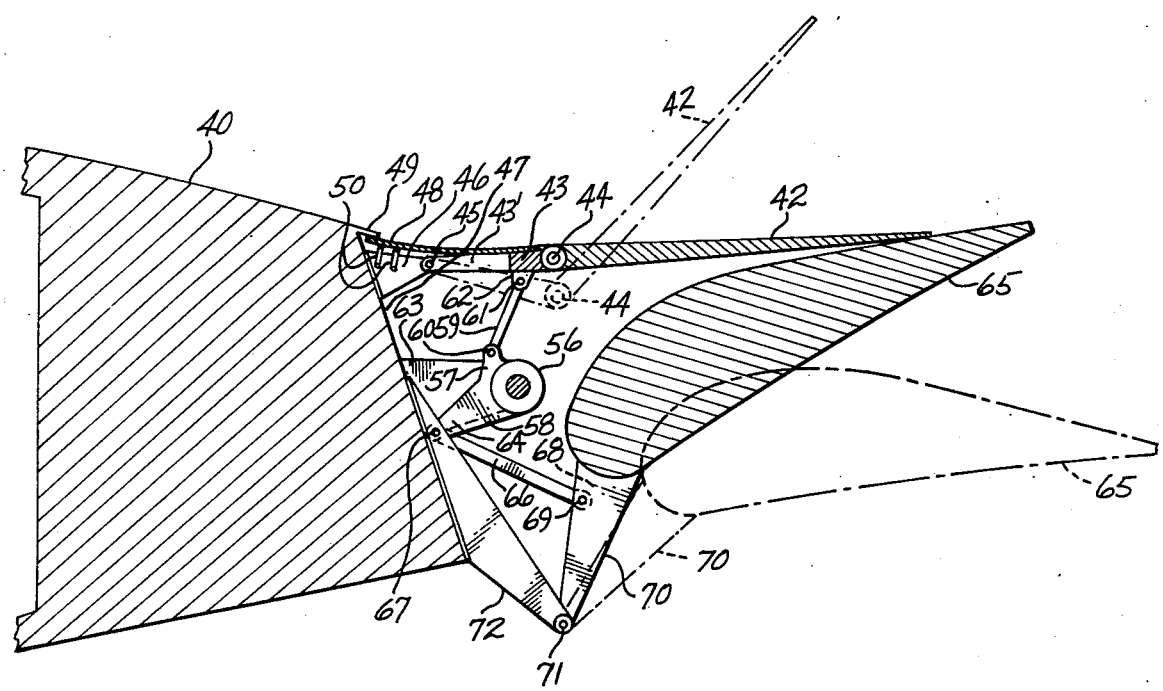
Figure 6:
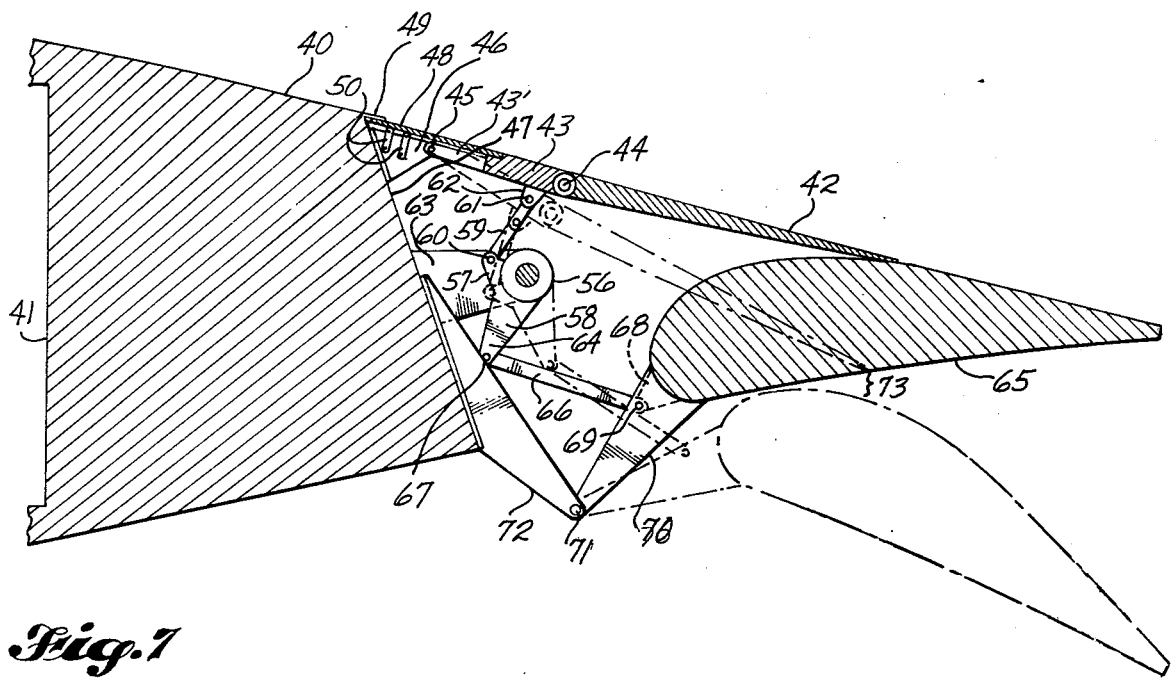

FIG. 6 is a schematic view of a second example of the subject invention adjusted for cruise. Takeoff and landing adjustment is shown in dashed lines.

FIG. 6a is a view which shows the FIG. 6 apparatus with the spoiler position for lift spoiling shown in dotted lines.

Figure 7:
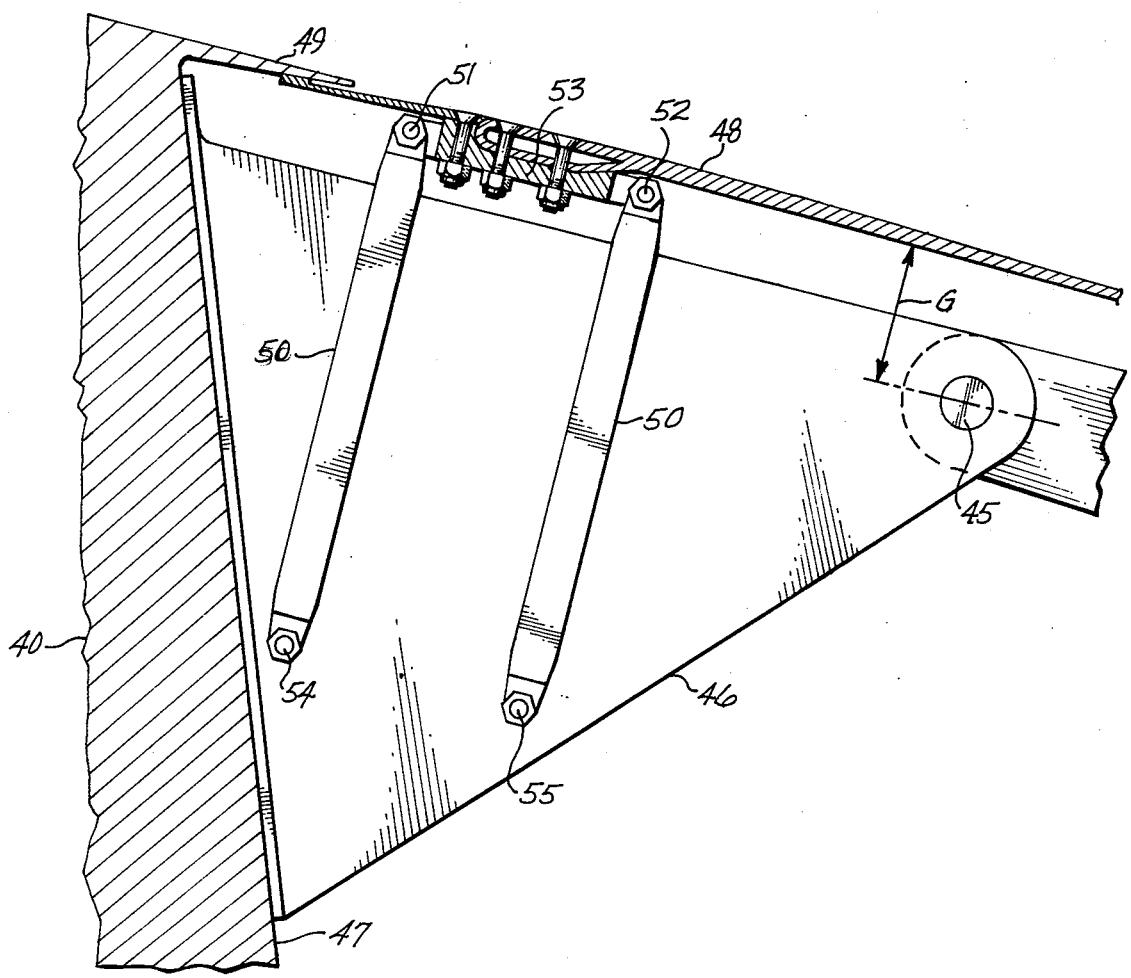

FIG. 7 is an enlarged view of one important mechanical detail of the FIG. 6 apparatus.

DESCRIPTIONS OF THE PREFERRED EMBODIMENTS

FIGS. 3, 4 and 5 illustrate one example of a presently preferred embodiment of the subject invention. As will be explained in more detail later, this embodiment provides for a single slotted flap configuration for takeoff and a double slotted configuration for approach and landing. Identical parts are numbered identically in all the figures. The figures are all schematic crossections of trailing edge system apparatus mounted on the aft end of wing structure 10. A spoiler assembly 11 is pivoted at 12 to a bracket 13 which is attached to the wing structure 10. Spoiler, or curvature flexure assembly 11 comprises a contoured panel 14 to which is fixedly joined a flexible panel 15. The forward end of panel 15 is joggled to form a recess 16 which engages a lip 17 extending from wing structure 10.

A flap assembly 18 includes the main flap 19 and a foreflap 20 supported from the main flap by spaced apart webs 21 so that a slot 22 is formed. It also includes struts 23 pivoted at 24 to struts 25 which are fixed to wing structure 10.

The spoiler assembly 11 is controlled by a hydraulic actuator 26 which is pivoted at 27 to a bracket 28 attached to wing structure 10 and pivoted at 29 to a lug 30 extending from panel 14.

The flap assembly 18 is controlled by a hydraulic actuator 31 pivoted at 32 to strut 25 and at 33 to a strut 23.

The upper surface of spoiler assembly panel 15, if free, would spring upward by approximately a distance D. Installed as shown, it is flexed as a spring and tends to lift panel 14 out of contact with flap 19. Actuator 26 functions to maintain the contact, against the spring action, as explained in more detail below.

In cruise operation actuator 31 functions to adjust flap assembly 18 as indicated, in different examples, by dashed lines in FIG. 3 and solid lines in FIG. 6a. These adjustments effect trim control and flight control.

In takeoff, as shown in FIG. 4, actuator 31 is extended to adjust the flap assembly 18 so that it is rotated about 45° from its cruise adjustment. Also, actuator 26 is contracted to keep panel 14 in contact with foreflap 20 of flap assembly 18. In this mode slot 22 is open to airflow as indicated by arrow 34. Cruise position of panel 14 is indicated by dashed lines, indicating that the curvature of the upper surface of the wing has been increased while retaining a continuously smooth curvature.

For approach and landing, as shown in FIG. 5, actuator 31 is extended further and flap assembly 18 is rotated about 60° from its cruise adjustment. Actuator 26 is shown contracted further, bending the spoiler assembly still farther from the cruise position, indicated by dashed lines, than it was for takeoff but not far enough to keep panel 14 in contact with foreflap 20. There are now two slots open for airflow, as indicated by arrows 34 and 35. Again the curvature of the upper surface of the wing has been increased and remains smooth.

Referring again to FIG. 3, lift spoiling by the spoiler assemblies, is achieved by extending actuator 26 causing the spoiler assembly 11 to rotate about point 12 to the position indicated by dashed lines. In this mode panel 15 is disengaged from lip 17, leaving a gap 36 between lip 17 and panel 15. The increase in pressure of the air on the upper surface of spoiler assembly 11 causes flow into gap 36 and the pressure acts on the portion of spoiler assembly 10 that is ahead of the pivot 12 as well as aft of the pivot. This distribution of some of the pressure force ahead of the pivot 12 assists in the actuation of the spoiler and allows actuator 31 to be smaller than if it had to provide the full actuation force. This smaller size saves weight and reduces control power requirements, thereby enhancing the airplane's efficiency.

FIGS. 6, 6a and 7 show a second example of the subject invention. As will be explained in more detail below, this embodiment provides single slot flap configurations for both takeoff and approach and landing. These figures are schematic crossectional views of trailing edge system apparatus mounted on the aft end of a fuel tank 40 which is part of the fixed structure of a wing 41. The trailing edge apparatus, in this example, includes a plurality of spanwise segments, and the figures are crossectional representations of a typical segment.

Each segment includes a spoiler assembly, a flap assembly, a flap actuator, a spoiler actuator and brackets and linkage as detailed below.

The spoiler assembly, in this example comprises a hinged panel 42, hinged to a panel 43, by a power hinge 44 of the type manufactured by the Curtiss Wright Corporation and Airesearch Manufacturing Company, Division of Garrett Corporation. These hinges, known in the art, are planetary gear boxes which serve both as a hinge and as a rotary actuator to drive the hinged element. Panel 43 is mounted on brackets 43' which are pivoted at 45 to brackets 46 which are fixed to the aft surface 47 of fuel tank 40. A flexible panel 48 is fixedly attached to the forward end of panel 43. The forward end of panel 48 slidably engages a lip 49 which extends from fuel tank 40. The travel and motion of the forward portion of panel 48 is further controlled by parallel links 50, shown in more detail in FIG. 7.

Links 50 are pivoted at 51 and 52 on bracket 53 which is fastened to panel 48. At their opposite ends they are pivoted at 54 and 55 to fixed structure, such as bracket 46. The action of links 50 causes the forward portion of panel 48 to move parallel to itself in an arc of radius equal to the distances from pivots 51 and 52 from pivots 54 and 55. The purpose of this action is explained below.

The spoiler assembly is actuated in part, as explained in more detail below, by an actuator 56, via a lug 57 on the actuator output arm 58 and link 59, pivoted at 60 to lug 57 and at 61 to a bracket 62 on panel 43.

Actuator 56 is supported from the aft wall 47 of fuel tank 40 by a bracket 63. An arm 64 of actuator output arm 58 drives a flap assembly 65 via a link 66. Link 66 is pivoted to arm 64 at 67 and to a bracket 68 at a point 69. Bracket 68 is attached to flap 65. Flap 65 is mounted on an arm 70, which is pivoted at 71 to brackets 72 attached to the aft wall 47 of fuel tank 40.

Dashed lines in FIG. 6 show the position of flap 65 for takeoff and approach and landing. Flap 65 is moved to this position by counterclockwise rotation of output bracket 64 of actuator 56. This same counterclockwise rotation, via the spoiler actuation linkage already described, causes spoiler assembly 43 to adjust downward to a position also indicated by dashed lines.

These relative positions of flap 65 and spoiler assembly 43 form a lift augmentation slot 73.

Referring to FIG. 6a, clockwise rotation of the actuator output arm to the desired limit of travel will drive spoiler assembly 43 and flap 65 to the positions shown. This type of adjustment is for trim and control purposes.

Conventionally spoiler assembly 43 is pivoted on point 45. However, when pivoted in this way, there is an undesirable noncontinuous change in contour of the upper surface of the wing at the hinge point. The flexibility of panel 48, as discussed above, and the action of links 50 provide continuous, smooth flowing contours over the hinge line.

Referring to FIG. 7, because panel 48 is displaced by a distance G from pivot 45, angular displacement of panel assembly 43 about point 45 causes linear displacement of panel 48 approximately parallel to the wing surface. This parallel motion is accommodated by links 50 as they also maintain the forward portion of panel 43 in smooth contour with the top surface of fuel tank 40.

Referring to FIG. 6a, for lift spoiling function by the spoiler, power hinge actuator 44 is operated to adjust panel 42 to a position as indicated by dashed lines.

The two described examples clearly meet the objectives of the subject invention. The mechanisms are simple, relative to known prior art. The flaps, functioning in conjunction with the spoiler assemblies, provide lift augmentation which would require a conventional flap with a chord approximately 50% greater than that of the subject flap, a chord approximately equal to the distance from the aft end 47 of fuel tank 40 to the trailing edge of flap 65, using the second example. The smaller size and weight of the subject flaps enhance the function of the flaps as primary flight controls, accordingly enhancing the use of full span lift augmentation. The lesser flap weight contributes toward keeping the overall structural weight low relative to maximum gross weight. The lower operating power requirements, as described for the spoilers of the first example, and the lower operating power requirements of the flaps, due to their smaller size and weight, also enhance the overall airplane efficiency. In addition aerodynamic efficiency of the airplane in all modes of flight operation is enhanced by the described provision of continuous, smooth curvature of the upper surfaces of the wings through the full range of flight control and lift augmentation adjustment of the trailing edge systems.

Two preferred examples of an embodiment of the subject invention are described herein and it is recognized that alternate embodiments may be implemented, as well as variations of the described embodiments, including, as set forth above, the example in which the upper surface flexings with continuity of curvature is achieved without the incorporation of spoiler apparatus per se. Accordingly, this invention is to be limited only by the scope of the appended claims.

What is claimed is:

1. A trailing edge apparatus for an airplane wing having fixed structure with an upper aerodynamic surface, said apparatus comprising:
   a spoiler assembly having an upper aerodynamic surface and a trailing edge; and
   a flap assembly having an upper aerodynamic surface;
      said upper surfaces forming effectively a continuation of said upper surface of said wing;
      said spoiler assembly being attached to said fixed structure by a pivot and two parallel links;
      said flap assembly being pivotally attached to said fixed structure; said spoiler assembly comprising:
         a first rigid element having an upper surface and being pivotally connected to said fixed structure;
         a second rigid element having an upper surface and being powered-hingedly attached to said first rigid element;
         a flexible element having a forward edge, an aft edge and an upper surface and being attached at said aft edge to said first rigid element and extending forward so that said forward edge slidably engages said fixed structure, said forward edge being held in said engagement by said parallel links;
      said upper surfaces in combination forming the aft upper surface of said wing;
   actuating means adapted to adjust the positions of said spoiler assembly and said flap assembly relative to each other and to said fixed structure, said flexible element flexing during said adjustments so that said upper aft surface of said wing is smoothly curved at all adjustment positions.

2. The apparatus as claimed in claim 1 in which said actuation means comprises:
   a rotary actuator having a stationary portion, affixed to said fixed structure, and an output element, having first and second arms;
   a first link means interconnecting said first arm and said first rigid element of said spoiler assembly for adjusting the position of said spoiler assembly;
   a second link means interconnecting said second arm and said flap assembly for adjusting the position of said flap assembly;
   said first and second link means and said first and second arms being arranged so that rotation of said output element of said rotary actuator simultaneously adjusts the positions of said spoiler assembly and said flap assembly.

3. A trailing edge apparatus for an airplane wing of the character having fixed structure with an upper aerodynamic surface, said apparatus comprising:
   a spoiler assembly having an upper aerodynamic surface and a trailing edge;
   a flap assembly having an upper aerodynamic surface;
      said upper surfaces in combination forming effectively a continuation of said upper surface of said wing;
      said spoiler assembly being pivotally attached to said fixed structure;
      said spoiler assembly comprising a rigid element including said pivotal connection of said spoiler assembly and having an upper surface forming part of said upper surface of said spoiler assembly and a flexible element attached to and extending forwardly from said rigid element;
      said flexible element having an upper surface forming part of said upper surface of said spoiler assembly;
      means for sliding interconnection between said flexible element and said fixed structure;
   means for actuating said spoiler assembly and said flap assembly for adjusting the positions of said spoiler assembly and said flap assembly relative to each other and to said fixed structure;
   said flap assembly including:
      a main flap element;
      a fore-flap element, and
      spaced webs attaching said fore-flap element to said main flap element so that a slot air passageway is formed spanwise between the two elements;
   said actuation means being of the character to pivot said spoiler assembly and said flap assembly downward and aft relative to said fixed structure and to each other to effect at least the three following configurations:
      said spoiler assembly closing off said slot;
      said spoiler assembly trailing edge contacting said flap assembly on said fore-flap so that said slot is clear; and said spoiler assembly trailing edge being spaced from said fore-flap so that said slot is clear and a second slot is formed between said trailing edge and said fore-flap;
said flexible element of said spoiler assembly being of the character to provide, by flexing, a smooth curvature of said upper aft wing surface for all configurations.

* * * * *